(12) United States Patent
Whitlock et al.

(10) Patent No.: US 9,802,715 B2
(45) Date of Patent: Oct. 31, 2017

(54) FASTENER SYSTEMS THAT PROVIDE EME PROTECTION

(75) Inventors: Richard P. Whitlock, Seattle, WA (US); Randall A. Rogers, Auburn, WA (US); Peter A. Coronado, Renton, WA (US); Sean D. Morden, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1073 days.

(21) Appl. No.: 13/434,835

(22) Filed: Mar. 29, 2012

(65) Prior Publication Data

US 2013/0259604 A1 Oct. 3, 2013

(51) Int. Cl.
*F16B 43/00* (2006.01)
*B64D 45/02* (2006.01)
*F16B 33/06* (2006.01)
*F16B 33/00* (2006.01)

(52) U.S. Cl.
CPC .............. *B64D 45/02* (2013.01); *F16B 33/06* (2013.01); *F16B 43/001* (2013.01); *F16B 33/004* (2013.01); *Y10T 29/49947* (2015.01)

(58) Field of Classification Search
USPC ................................ 411/377, 542, 903, 914
See application file for complete search history.

(56) References Cited

U.S. PATENT DOCUMENTS

| | | | | |
|---|---|---|---|---|
| 1,296,165 A | * | 3/1919 | Costuma | 411/406 |
| 3,413,591 A | * | 11/1968 | Hergenhan | 439/217 |
| 3,618,444 A | * | 11/1971 | Kay et al. | 11/373 |
| 3,627,334 A | * | 12/1971 | Reddy | 411/542 |
| 3,765,464 A | * | 10/1973 | Hasegawa | 411/108 |
| 4,342,530 A | | 8/1982 | Baker et al. | |
| 4,348,140 A | * | 9/1982 | Bergholz et al. | 411/103 |
| 4,630,168 A | | 12/1986 | Hunt | |
| 4,681,497 A | * | 7/1987 | Berecz | 411/377 |
| 4,815,920 A | * | 3/1989 | Morooka | 411/431 |
| 5,018,920 A | | 5/1991 | Speakman | |
| 5,193,960 A | * | 3/1993 | Fukushima et al. | 411/542 |
| 5,332,348 A | * | 7/1994 | Lemelson | 411/427 |
| 6,327,132 B1 | * | 12/2001 | Andrivet et al. | 361/218 |
| 6,665,922 B2 | | 12/2003 | Schultz | |
| 6,808,181 B1 | * | 10/2004 | Shemtov | 277/606 |
| 7,350,419 B2 | * | 4/2008 | Luthje et al. | 73/761 |
| 7,599,164 B2 | | 10/2009 | Heeter et al. | |
| 7,695,226 B2 | | 4/2010 | March et al. | |

(Continued)

FOREIGN PATENT DOCUMENTS

| | | | |
|---|---|---|---|
| CA | 2857837 A1 | 5/2015 | |
| EP | 2184227 A1 | 5/2010 | |

(Continued)

OTHER PUBLICATIONS

Mulazimoglu et al., "Recent Developments in Techniques to Miniminze Lightning Current Arcing Between Fasteners and Composite Structures", http://www.alcoa.com/fastening_systems/aerospace/en/pdf/Hasim_ICOSLE_2011.pdf, Sep. 2011.

(Continued)

*Primary Examiner* — Flemming Saether
(74) *Attorney, Agent, or Firm* — Miller, Matthias & Hull LLP (57) ABSTRACT

Fasteners are inserted into a stack of members and terminated with parts having at least one of a dry dielectric coating and a dry dielectric seal at select locations to protect against electromagnetic effects (EME).

4 Claims, 7 Drawing Sheets

(56) References Cited

U.S. PATENT DOCUMENTS

| | | | |
|---|---|---|---|
| 7,740,434 B2 * | 6/2010 | Kamino et al. | 411/372.5 |
| 7,755,876 B2 | 7/2010 | Morrill et al. | |
| 7,907,382 B2 * | 3/2011 | Hernandez | 361/218 |
| 7,936,550 B2 | 5/2011 | Morrill et al. | |
| 2006/0239797 A1 * | 10/2006 | Evanbar | 411/542 |
| 2009/0258220 A1 | 10/2009 | Schaaf et al. | |
| 2010/0224724 A1 | 9/2010 | Kamino et al. | |
| 2010/0270513 A1 | 10/2010 | Haylock et al. | |
| 2010/0272537 A1 | 10/2010 | Haylock et al. | |
| 2010/0278616 A1 | 11/2010 | March et al. | |
| 2012/0074257 A1 * | 3/2012 | Bessho et al. | 244/1 A |
| 2012/0236457 A1 | 9/2012 | Yamakoshi et al. | |
| 2013/0259604 A1 | 10/2013 | Whitlock et al. | |
| 2014/0055906 A1 | 2/2014 | Whitlock et al. | |

FOREIGN PATENT DOCUMENTS

| | | |
|---|---|---|
| EP | 2500273 A2 | 9/2012 |
| EP | 2830948 A2 | 2/2015 |
| EP | 2871132 A1 | 5/2015 |
| GB | 2212580 A | 7/1989 |
| JP | 200983640 A | 4/2009 |
| JP | 2009227166 A | 10/2009 |
| JP | 2010254287 A | 11/2010 |
| RU | 2292083 C2 | 1/2007 |
| WO | 2010113523 A1 | 10/2010 |
| WO | 2013176722 A3 | 11/2013 |

OTHER PUBLICATIONS

"Conductive sealants stop EMI, fire, and corrosion" Machine Design, vol. 62, No. 7, pp. 40-42, ISSN 0024-9114 (Apr. 1990).

Japanese Office Action related to Application No. 2015-503219; dated Feb. 21, 2017.

Canadian Office Action for Related Patent Application No. 2,865,161; Report dated Jun. 2, 2016.

Russian Office Action for Related Patent Application No. 22014131315/12; Report dated Jan. 18, 2017.

* cited by examiner

FASTENER SYSTEMS THAT PROVIDE EME PROTECTION

BACKGROUND

Lightweight composite materials hold promise for the aircraft industry. Fiber composites provide a significant improvement in specific strength and stiffness over conventional metal alloys. Better specific strength and stiffness translates into weight savings, which translates into fuel savings and lower operating costs. Additionally, composites do not corrode like aluminum, and they are more resistant to fatigue.

Composite structures in these aircraft do not readily conduct away the extreme electrical currents and electromagnetic forces generated by lightning strikes.

Aircraft with composite structures may be equipped with protection against electromagnetic effects (EME) from lightning strikes. For example, conductive media may be provided on a surface to divert lightning current away from underlying metal fastener systems. In addition, gaps between fastener parts and gaps between fastener parts and structural members may be filled with dielectric sealant. Even if some current is not diverted, the sealant prevents arcing and sparking across the gaps.

The sealant provides EME protection. However, the process of injecting the sealant is time consuming as it involves multiple steps, including surface cleaning, sealant curing and overfill removal. Moreover, the sealant adds weight to an aircraft. The weight added to a single fastener system might seem insignificant. However, applying the sealant to tens of thousands of fasteners in a single aircraft can add hundreds of pounds.

SUMMARY

According to an embodiment herein, a method comprises inserting fasteners into a stack of members and terminating the fasteners with parts having at least one of a dry dielectric coating and a dry dielectric seal at select locations to protect against electromagnetic effects (EME).

According to another embodiment herein, a fastener comprises a fastener head having an upper surface with multiple mechanical interlocking sites that are configured to retain a dielectric layer; and a dry dielectric layer covering the upper surface of the head. The dielectric layer is mechanically interlocked with the interlocking sites.

According to another embodiment herein, a part for terminating a fastener comprises a fastener termination body having a central opening, and at least one feature for protecting against EME effects. The at least one feature includes at least one of a dielectric coating and a dielectric seal partially covering the central opening at a select location. The seal is secured to the body. The coating and the seal have a thickness and composition for inhibiting lightning current. The select location includes at least one of a distal location and a proximal location.

According to another embodiment herein, a fastening system comprises a fastener, at least one fastener termination part, and EME protection features for the fastener and each fastener termination part. The EME protection features are taken from the group consisting of a conductive resin coating on a shaft of the fastener, an interlocked dielectric cover on a head of the fastener, a dielectric seal on a proximal location of the fastener head, a dielectric seal on a distal location of the termination part, a dielectric seal on an proximal location of the termination part, a dielectric coating on a distal location of the termination part, and a dielectric coating on a proximal location of the termination part.

These features and functions may be achieved independently in various embodiments or may be combined in other embodiments. Further details of the embodiments can be seen with reference to the following description and drawings.

DETAILED DESCRIPTION

Figure 1:
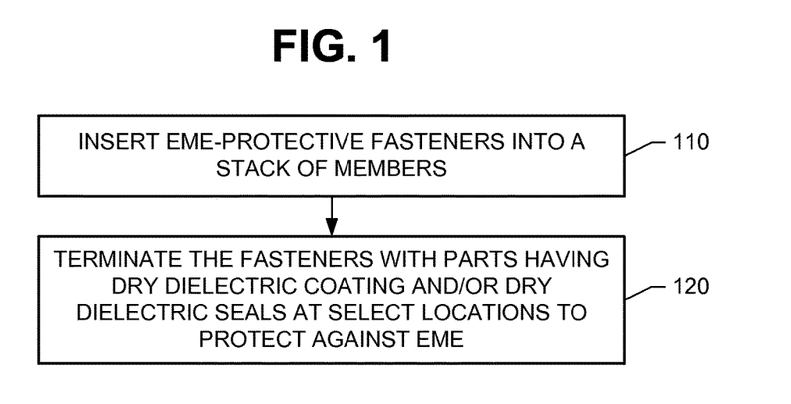
FIG. 1 is an illustration of a method of fastening a stack of members.

Reference is made to FIG. 1, which illustrates a method of fastening a stack of members. The stack has two or more members. In some embodiments, all of the members in the stack are made of metal (e.g., aluminum, titanium). In other embodiments, at least one of the members in the stack is made of composite material. For instance, an outer member is made of composite material and an inner member is made of metal. In other embodiments, all of the members in the stack may be made of composite material.

The method includes inserting fasteners into the stack (block 110). In some embodiments, the fasteners are inserted in pre-formed through-holes in the stack. In other embodiments, the fasteners are inserted without drilling holes. Fasteners may be countersunk into the outer members whose outer surfaces require aero smoothness (e.g., aircraft skin). The fasteners may have EME protective features including dry dielectric layers interlocked to upper surfaces of fasteners heads, and dry dielectric seals on lower surfaces of the fasteners heads.

The method further includes terminating the fasteners with parts having EME protective features. The EME protective features for the termination parts include dry dielectric coatings and dry dielectric seals (e.g., dielectric sleeves) at select locations (block 120).

Without these EME protection features, arcing and sparking may occur. Arcing occurs when two metallic parts are in near contact, and dielectric properties of the medium between break down due to high currents flowing between the parts. Sparking occurs when a high current ionizes air in a gap between two parts, the air breaks down, and current flows across the gap. Hot particle ejection occurs when a high current in a composite part causes composite material to chemically break down and generate hot expanding gas.

Both the dielectric coating and the dielectric seal prevent arcing and sparking by blocking the electrical bonding path between parts. The dielectric coating and the dielectric seal, alone and in combination, inhibit arcing and sparking across gaps between fastener parts (e.g., gap between fastener and nut, and gap between washer and nut) and gaps between fastener parts and structure (e.g., gaps between fastener and structure, nut and structure, and washer and structure). The dielectric seal performs the additional function of preventing hot gas from being ejected across gaps and keeping the gas within the fastening system.

In addition to or in the alternative, some embodiments of the fasteners may reduce arcing, sparking and hot particle ejection by improving the electrical bonding path. In these embodiments, shafts of the fasteners may be coated with a conductive coating (e.g., a conductive resin) to improve the electrical bond between the fastener and stack and thereby reduce contact resistance. In some embodiments, the fasteners may be clearance fitted into the holes. In other embodiments, the fasteners may be interference fitted into the holes. The interference fit improves electrical bonding between the fastener and stack (by increasing surface contact area), which reduces current densities and lowers overall path resistance.

The use of dry dielectric coating on parts of a fasteners system offers several advantages over the use of sealant to fill the gaps. The advantages include ease and speed of installation. The dry dielectric may be coated onto the fastener parts prior to installation so that during fastening, the fasteners need only be installed. Extra steps, such as masking parts of the stack, injecting sealant, and curing the sealant, are eliminated.

Another advantage is a reduction in weight. The dry dielectric coatings and seals may be thinner than layers of sealant. In some embodiments, the thickness of the dielectric coating or seal may be 30 mils±10 mils. Moreover, less surface area is covered, since an entire surface of a fastener part is not covered with a dry dielectric coating or dry dielectric seal.

Another advantage is redundant EME protection. Different embodiments of fasteners may be used in combination with different embodiments of termination parts (e.g., nuts and washers) to provide multiple levels of protection against EME.

Figure 2:
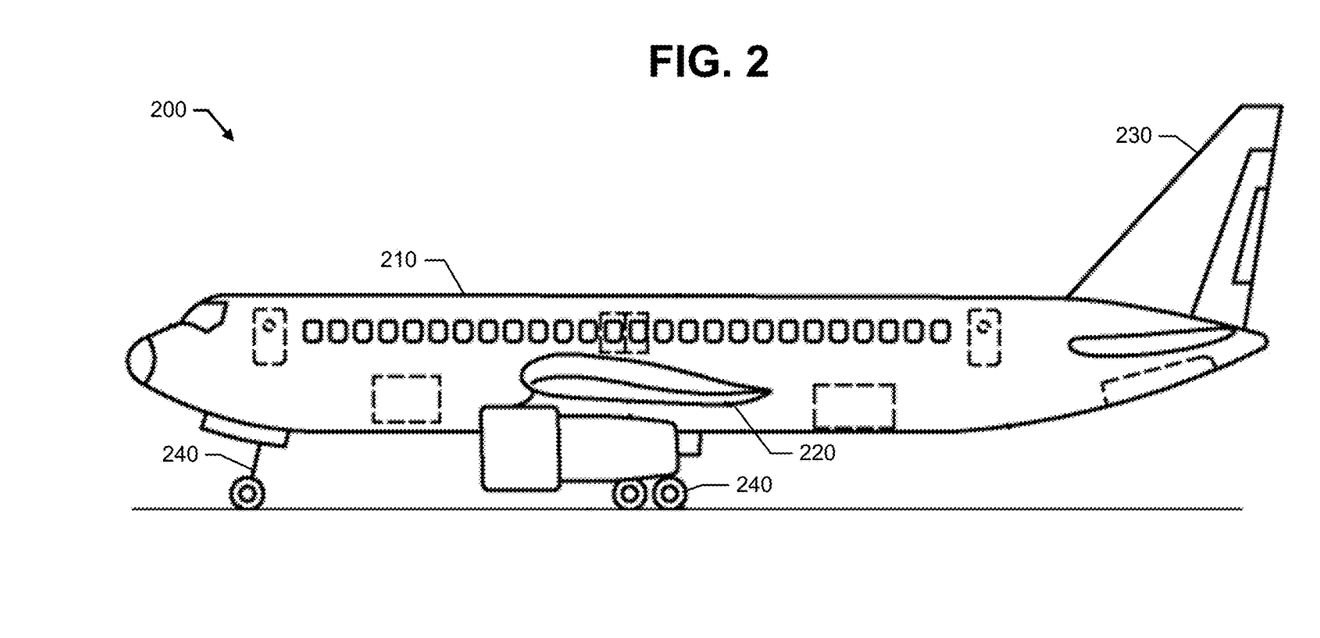
FIG. 2 is an illustration of a commercial aircraft.

These advantages are substantial with respect to a commercial aircraft, such as the commercial aircraft 200 illustrated in FIG. 2. The aircraft 200 includes a fuselage 210, wing assemblies 220, empennage 230, and landing gear assemblies 240. In this commercial aircraft 200, one million fastener systems might be used to fastener together the various components 210-240 and their subcomponents.

In certain locations of the aircraft 200, EME protection is desirable. For instance, EME protection is desirable for wing assemblies and other structures. To provide EME protection, the wing assemblies 220 may be assembled with as many as 20,000 fasteners according to a method herein. The advantages realized by weight savings and time and ease of installing those 20,000 fasteners are quite substantial.

In the following paragraphs, different types of EME-protective fastener parts will be described. These fasteners parts include fasteners and parts that terminate the fasteners (e.g., nuts and washers). These fastener parts may have dry dielectric coatings and/or dry dielectric seals at select locations to protect against EME.

First, the EME-protective fasteners will be described. Examples of fasteners include, but are not limited to bolts and rivets.

Figure 3A:
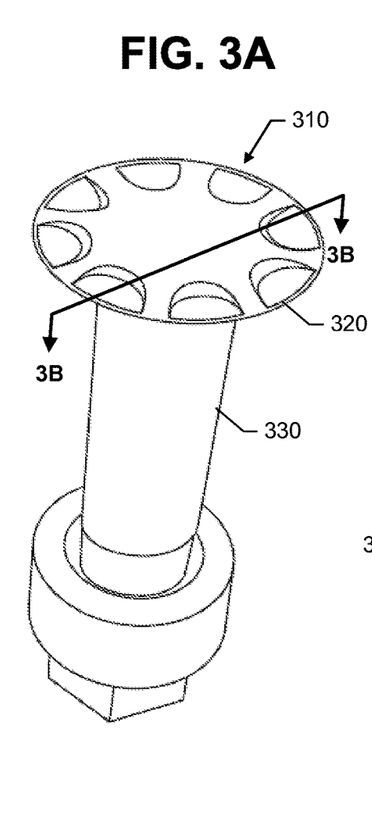
FIGS. 3A and 3B are illustrations of a first embodiment of an EME-protective fastener.
Figure 3B:
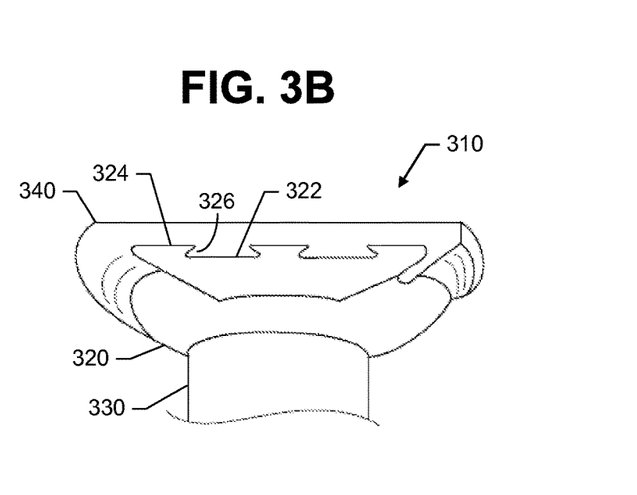

Reference is now made to FIGS. 3A and 3B, which illustrates a first embodiment of an EME protective fastener 310. FIG. 3B is a sectional view taken along lines 3B-3B in FIG. 3A. The fastener 310 includes a head 320 and a shaft 330. An upper surface 322 of the fastener head 320 has multiple mechanical interlocking sites that are configured to retain a dielectric layer 340. Each interlocking site includes a protrusion 324 extending upwards from the upper surface 322. The protrusion 324 has an undercut portion 326 proximate the upper surface 322. In the embodiment of FIGS. 3A and 3B, the protrusions 324 may be spokes 324 that extend radially outward and have a cross section of an inverted triangle.

The fastener 310 further includes a dielectric layer 340 covering the fastener head 320. The dielectric layer 340 is not limited to any particular dielectric material. Examples include, but are not limited to, thermosets, thermoplastics, rubber, ceramics, and elastomers.

The dielectric layer 340 fills the undercut portions and all other space between the protrusions 324. The dielectric layer 340 is also in intimate contact with the upper surface 322 and the protrusions 324.

In some embodiments, the dielectric layer 340 may be formed by flowing a dielectric material over the fastener head 320. When the dielectric material flows over the surface 322, it fills the undercuts 326 and all space between the protrusions 324. Once the dielectric material hardens, it is interlocked with the protrusions 324 and thereby secured to the fastener head 320. In other embodiments, the dielectric layer 340 may be formed by powder coating, painting, plating, spraying, sputtering, deposition, or any other process that allows the dielectric material to fill the undercut portions 326.

In this manner, the dielectric layer 340 is mechanically interlocked with the interlocking sites prior to fastener installation. The fastener 310 with the dielectric layer 340 is preinstalled to the head 320.

The interlocking of the dielectric layer 340 to the fastener head 320 is especially advantageous for lightning strikes. The interlocking ensures that the dielectric layer 340 maintains intimate contact with the fastener head 320 during and after such events.

The dielectric layer 340 may be retained by additional means. As a first example, the surface 322 may have roughness to enhance the retention to the dielectric layer 340. As a second example, the dielectric layer 340 may be made of a material (e.g., adhesive sealant) that adheres to the surface 322.

In other embodiments of EME-protective fasteners, the interlocking sites may have other cross-sections and they may be arranged in other patterns. Examples of other cross-sections include, but are not limited to square and circular cross-sections. Cross sections having areas of high stress concentration (e.g., corners) are not preferred. Rounded cross sections provide better mechanical properties.

An EME-protective fastener herein is not limited to any particular number of interlocking sites. However, it has been found that a range of five to nine interlocking sites provides a good balance between interlocking strength (with the dielectric layer) and fastener clamp-up strength.

Figure 4A:
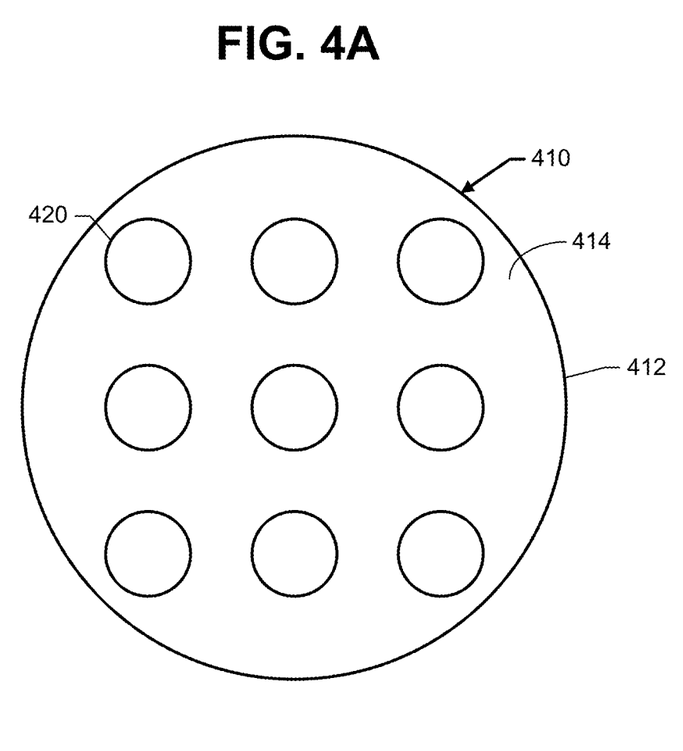
FIGS. 4A and 4B are illustration of a second embodiment of an EME-protective fastener.
Figure 4B:
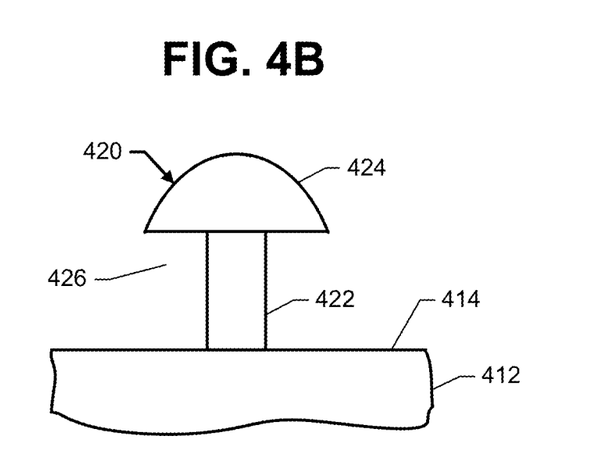

Reference is now made to FIGS. 4A and 4B, which illustrates a second embodiment of an EME-protective fastener 410. The EME-protective fastener 410 includes interlocking sites 420 arranged in a grid. Each interlocking site 420 includes a post 422 extending upward from an upper surface 414 of the fastener head 412. The post 422 terminates in a knob 424. The post 422 and the surfaces between the knob 424 and fastener head 412 define an undercut portion 426.

Figure 5:
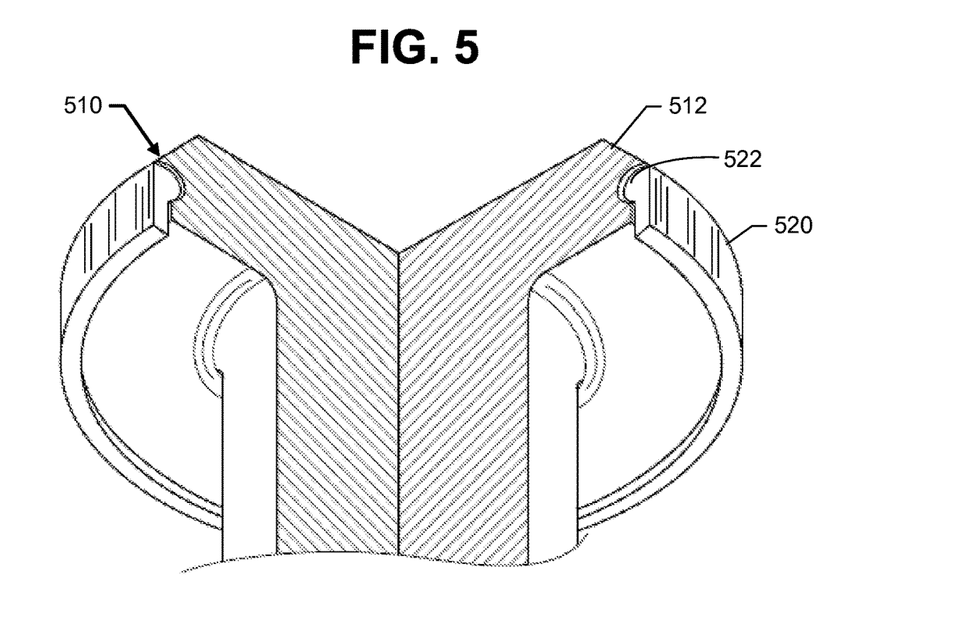
FIGS. 5 and 6 are illustrations of other embodiments of EME-protective fasteners.
Figure 6:
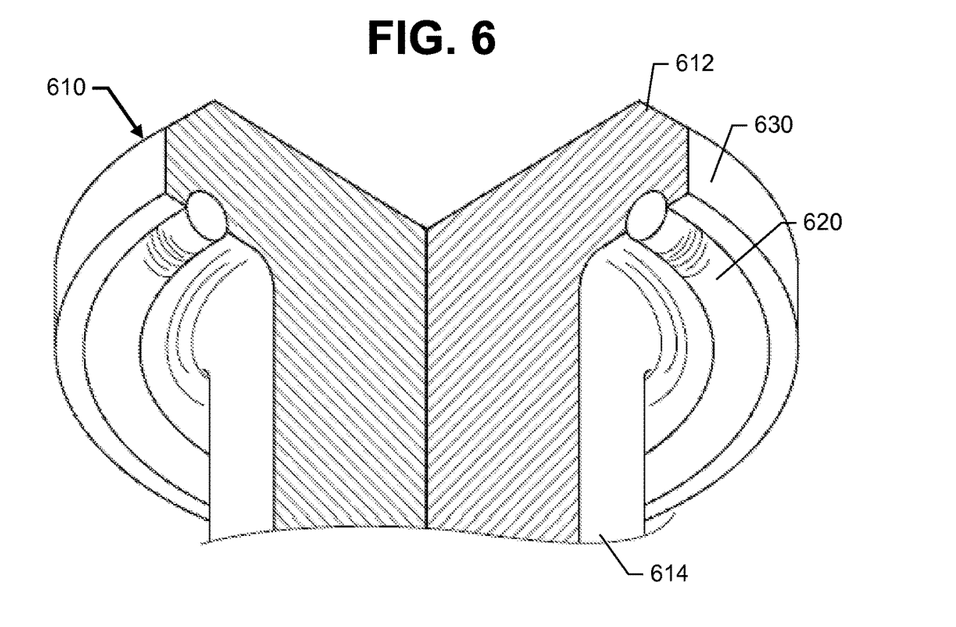

Reference is now made to FIGS. 5 and 6, which illustrate embodiments of fasteners 510 and 610 including heads 512 and 612 and dielectric seals 520 and 620. The seals 520 and 620 may be mechanically attached to the fastener heads 512 and 612. The seals 520 and 620 be made of a polymeric material such as polytetrafluoroethylene (PTFE), or thermoplastic polymers such as polyether ether ketone (PEEK) and polyamide-imides. When the fastener 510 or 610 is inserted into a stack and terminated, its seal 520 or 620 makes compressive contact with the stack.

In the fastener 510 of FIG. 5, the seal 520 fits around a periphery of the fastener head 512. The seal 520 may have a ridge 522 that fits into a groove in the fastener head 512. The seal 520 inhibits arcing and sparking at the edge of the fastener head 520, and it impedes hot expanding gas underneath the head 512 from escaping.

In the fastener 610 of FIG. 6, the seal 620 has the shape of an O-ring and fits in a groove in an underside of the fastener head 612. The seal 620 inhibits arcing and sparking, and it impedes escape of any hot expanding gas between the stack and the fastener's shaft 614. The upper surface and side of the fastener head 612 may be covered with a dielectric coating 630 to prevent arcing and sparking at the edge of the fastener head 612.

Figure 7:
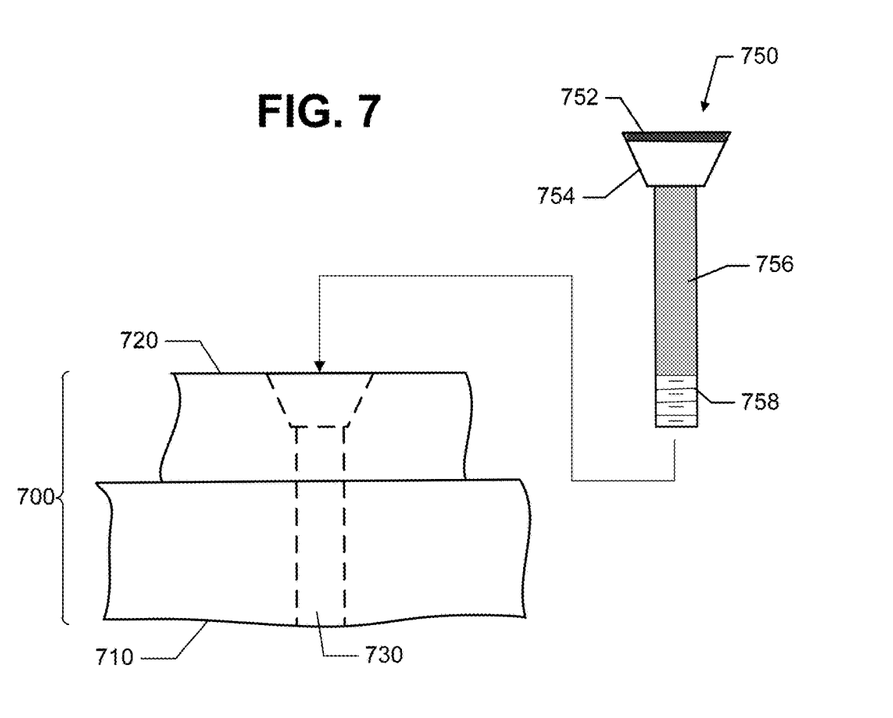
FIG. 7 is an illustration of a stack including a composite member and a conductive layer.

Reference is now made to FIG. 7, which illustrates stack 700 including a composite member 710 and a conductive layer 720 (e.g., metal strips, expanding foil) that covers the composite member 710. An EME-protective fastener 750 is inserted into a through-hole 730 in a composite member 710 and countersunk into the conductive layer 720. The dielectric layer 752 on the fastener's head 754 is flush with the conductive layer 720.

In some embodiments, the entire fastener shaft 230 may be coated with a dry conductive resin coating 756 (shaded in gray) having electrically conductive particles dispersed in a polymer matrix. Examples of the conductive particles include, but are not limited to, metal particles, and nanotubes. It has been found that the resin, in combination with an interference fit, improves the electrical bond path between the fastener 750 and the composite member 710. The resin fills voids between the fastener shaft 758 and the composite member 710. By doing so, the resin increases the effective contact area with fibers of the composite member 710.

As the fastener 750 is being terminated (e.g., as a nut is being wrenched onto the fastener 750), it should not rotate within the through-hole 730. To prevent rotation without damaging the dielectric layer 752, an anti-rotation measure may be used. Examples of anti-rotation measures include, but are not limited to, creating an interference (or friction) fit between the fastener shaft 758 and the member 710; providing the shaft 758 with a cross-sectional shape that prevents rotation (e.g., a hexagonal shape for the shaft and through-hole), and keying the shaft 758 to the member 710.

Fasteners herein may be used anywhere in an aircraft. As examples, fasteners herein may be used in door surrounds, electrical equipment housing, and parts that are subject to ground fault currents. Fasteners herein may be terminated with standard parts (e.g., standard nuts) or they may be terminated with EME-protective parts herein.

In the following paragraphs, different types of EME-protective fastener termination parts will be described. These parts include nuts and washers.

Figure 8:
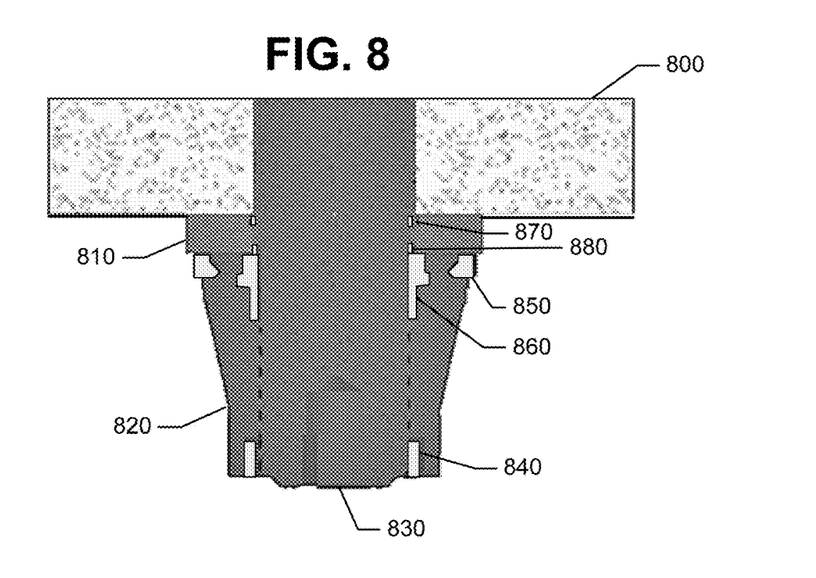
FIG. 8 is an illustration of select EME protection locations on a nut.

Reference is now made to FIG. 8, which illustrates a fastener 830 extending through a member of a stack 800, and a washer 810 and nut 820 that terminate the fastener 830. FIG. 8 also illustrates various locations on the washer 810 and nut 820 that may be covered with a dry dielectric coating dielectric seal to protect against EME. The locations on the nut 820 include an inner distal location 840, an outer proximal location 850, and an inner proximal location 860. The locations on the washer 810 include an inner proximal location 870 and an inner distal location 880. The terms "proximal" and "distal" refer to the distance from the stack 800. For instance, the proximal location of the nut 820 is closer to the stack 800 than the distal location. The terms "inner" and "outer" refer to the distance from the fastener shaft.

Instead of covering the entire washer 810 and nut 820 with sealant to protect against EME, only one or more of these locations 840-880 may be coated or sealed with dry dielectric material.

If a seal is used, the seal is secured to a central opening in the body and protrudes axially from the body. In some embodiments, the seal protrudes at least 7 mils from the body. The seal may be made of a polymeric material such as polytetrafluoroethylene (PTFE), or thermoplastic polymers such as polyether ether ketone (PEEK) and polyamide-imides. The seal may be mechanically attached by using protrusions and undercuts that allow polymeric material to flow into the undercuts.

Reference is now made to FIG. 8, which illustrates a fastener 830 extending through a member of a stack 800, and a washer 810 and nut 820 that terminate the fastener 830. FIG. 8 also illustrates various locations on the washer 810 and nut 820 that may be covered with a dry dielectric coating or dielectric seal to protect against EME. The locations on the nut 820 include an inner distal location 840, an outer proximal location 850, and an inner proximal location 860. The locations on the washer 810 include an inner proximal location 870 and an inner distal location 880. The terms "proximal" and "distal" refer to the distance from the stack 800. For instance, the proximal location of the nut 820 is closer to the stack 800 than the distal location. The terms "inner" and "outer" refer to the distance from the fastener shaft.

Figure 9:
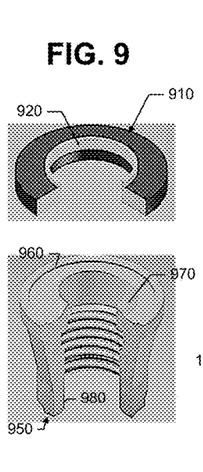
FIGS. 9-12 are illustrations of different embodiments of washers and nuts having EME protection features and different combinations of the washers and nuts.

Reference is made to FIG. 9, which illustrates a combination including a washer 910 having a seal 920 at the inner proximal location. The distal location is not covered. The outer surface of the washer 910 is coated with a dielectric material.

The combination also includes a nut 950 having a seal 960 at the outer proximal location, a seal 970 at the inner proximal location, and a dielectric coating 980 at the distal location. There is no dielectric coating on the exterior surface of the nut 950.

When the nut 950 and the washer 910 are mated with the stack, the inner proximal seal 920 of the washer 910 is pressed against the stack, and the inner proximal seal 970 of the nut 950 is received in the central opening of the washer 910. As the nut 950 is tightened, the washer seal 920 folds back and is crushed against the stack, thereby filling any voids between the washer 910 and the stack.

Figure 10:
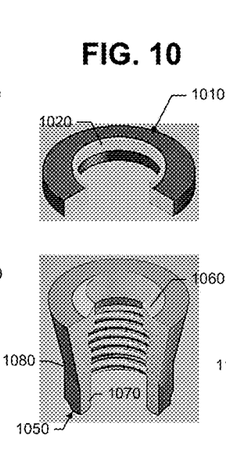

Reference is made to FIG. 10, which illustrates a combination including a washer 1010 having a seal 1020 at the inner proximal location, and a nut 1050 having a seal 1060 at the inner proximal location, a dielectric coating 1070 at the distal location, and a dielectric coating 1080 on the outer surface (instead of a seal at the outer proximal location).

Figure 11:
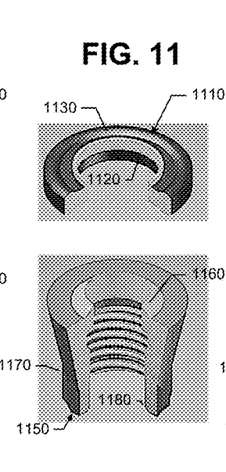

Reference is made to FIG. 11, which illustrates a combination including a washer 1110 having a seal 1120 at the inner proximal location, and a concentric ridge 1130 formed at a periphery of the washer 1110. The combination also includes a nut 1150 having a seal 1160 at the inner proximal location, a dielectric coating 1170 on the outer surface (instead of a seal at the outer seal location), and a seal 1180 at the inner distal location.

When the nut 1150 and the washer 1110 are mated with the stack, the inner proximal seal 1120 and the ridge 1130 of the washer 1110 are pressed against the stack, and the inner proximal sleeve 1160 of the nut 1150 is received in the central opening of the washer 1110. As the nut 1150 is tightened, the inner proximal seal 1120 of the washer 1110 folds back and is crushed against the stack. The concentric ridge 1130 also maintains a seal between the washer 1110 and the stack, even if the face of the washer 1110 is not parallel with the bottom face of the stack.

Figure 12:
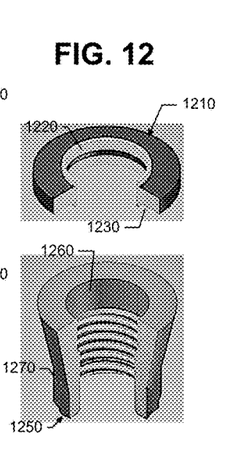

Reference is now made to FIG. 12, which illustrates a combination including a washer 1210 having seals 1220 and 1230 at the inner proximal and distal locations. There is a gap between these seals 1220 and 1230. The combination further includes a nut 1250 with a dielectric coating 1270 over the entire exterior surface, and a coating 1260 at the inner proximal location.

When the nut 1250 and the washer 1210 are mated with the stack, the proximal seal 1220 of the washer 1210 is pressed against the stack, and the distal seal 1230 of the washer 1210 is received in the inner proximal location of the nut 1250. As the nut 1250 is tightened, the proximal seal 1220 of the washer 1210 folds back and is crushed against the stack, and the distal seal 1230 of the washer 1210 folds back and is crushed against the nut 1250.

A washer herein is not limited to a concentric ridge at the periphery. Other embodiments of washers may have concentric ridges at intermediate and inner portions of the washer's upper face. Some embodiments may have concentric ridges on both faces.

In some embodiments, the concentric ridge may be formed by stamping a concentric groove in the washer, and filling the groove with a dielectric ring. In other embodiments, a metal ridge may be stamped in the washer.

Although FIGS. 9-12 illustrate nuts 950, 1050, 1150, 1250 that are open at both ends, a nut herein is not so limited. For instance, one end of a nut herein may be closed to form a cap. The cap may be made of a dielectric material, or the cap may be made of metal with its inner surface coated with a dielectric material. Such a cap would provide additional protection against distal arcing and sparking.

A fastening system herein is not limited to the combinations of fasteners, nuts and washers described above. A variety of EME protection features may be mixed and matched. Multiple parts having different features may be used. For example, the EME protection features may be taken from the group consisting of a conductive resin coating on a shaft of the fastener, an interlocked dielectric cover on a head of the fastener, a dielectric seal on a proximal location of the fastener head, a dielectric seal on a distal location of the termination part, a dielectric seal on an proximal location of the termination part, a dielectric coating on a distal location of the termination part, and a dielectric coating on a proximal location of the termination part.

Figure 13:
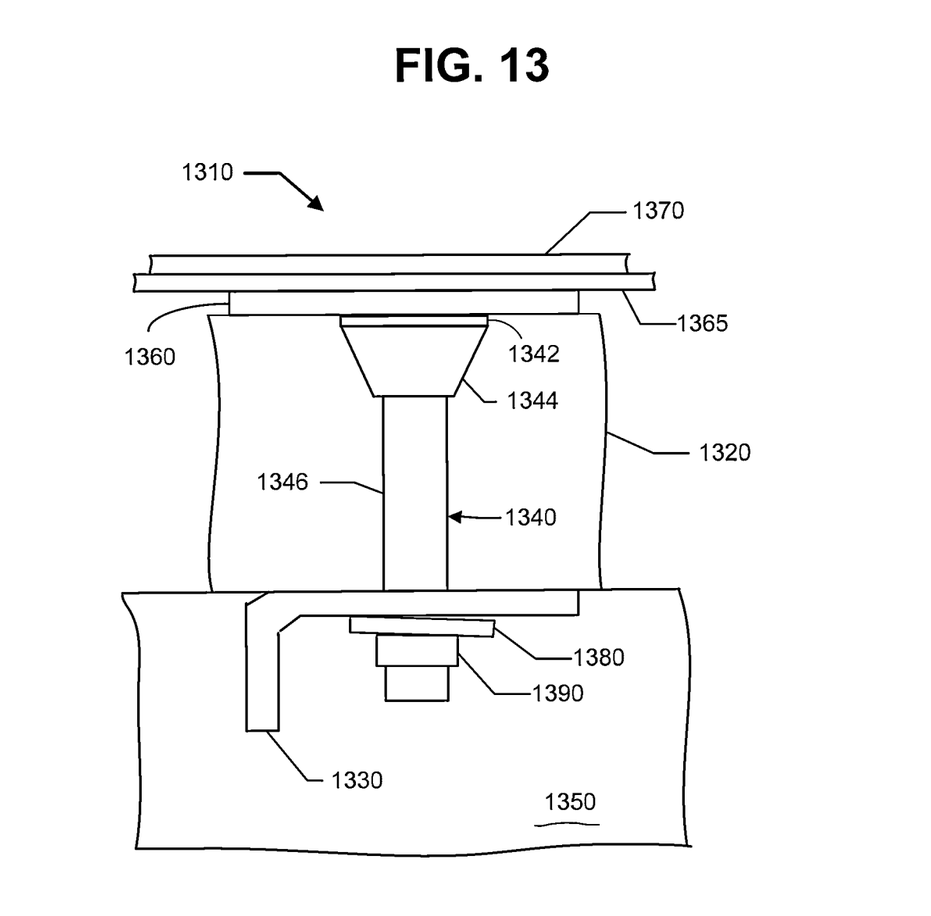
FIG. 13 is an illustration of an aircraft structure.

Reference is now made to FIG. 13, which illustrates a portion of an aircraft wing 1310. The wing 1310 includes skin 1320 made of a composite material such as carbon fiber reinforced plastic (CFRP). The skin 1320 may be fastened to a substructure (represented by the bracket) 1330 by metal fastener parts 1340, 1380 and 1390. The skin 1320 defines a lightning susceptible area 1350.

Each fastener 1340 has a dielectric layer 1342 that is interlocked with a fastener head 1344. Each fastener 1340 may have a conductive resin coating on its shaft 1346.

Each fastener 1340 is countersunk into the skin 1320. The dielectric layer 1342 is flush with the upper surface of the skin 1320. A metal foil 1360 covers the skin 1320 to dissipate EME current. A surfacing film (e.g., a glass-epoxy layer) 1365 is applied over the skin 1320, and the surfacing film 1365 is covered with paint 1370.

Each fastener 1340 is terminated with a washer 1380 and a nut 1390. The washer 1380 and the nut 1390 have various EME protection features.

There might be tens of thousands of fasteners 1340, washers 1380, and nuts 1390 in the wing 1310. By using EME protection features herein instead of injecting sealant, the savings in installation time is substantial. The reduction in weight is also substantial.

FIG. 13 illustrates the surface of the washer 1380 and bracket 1330 being slightly skewed. If the washer 1380 is provided with an upper sleeve or a concentric ridge on the upper surface, any gap between the washer 1380 and bracket 1330 will be filled with dielectric material and sealed.

Similarly, if the nut 1390 is slightly skewed with respect to the washer 1380, or if a washer is not used and the nut is slightly skewed with respect to the stack, any gap between the nut and washer or nut and stack will be filled with dielectric material and sealed.

Thus, the EME protection features provide the added advantage of making the structure less dependent on geometry. Even if mating surfaces of the termination parts aren't perfectly flush, EME protection is still provided.

The invention claimed is:

1. A part for terminating a fastener, the part comprising:
   a fastener termination body including a washer having a central opening; and
   a dry dielectric coating on the fastener termination body, and a first dielectric seal partially covering the central opening at one of a distal and proximal location, the first dielectric seal secured to the fastener termination body, the dry dielectric coating and the first dielectric seal having a thickness and composition for inhibiting lightning current.

2. A part for terminating a fastener, the part comprising:
   a fastener termination body including a washer having a central opening; and
   a dry dielectric coating on the fastener termination body, and a first dielectric seal partially covering the central opening at an inner proximal location of the washer, the first dielectric seal secured to the fastener termination body, the dry dielectric coating and the first dielectric seal having a thickness and composition for inhibiting lightning current.

3. A part for terminating a fastener, the part comprising:
   a fastener termination body including a washer having a central opening;
   a dry dielectric coating on the fastener termination body, and a first dielectric seal partially covering the central opening at an inner proximal location of the washer, the first dielectric seal secured to the fastener termination body, the dry dielectric coating and the first dielectric seal having a thickness and composition for inhibiting lightning current; and
   a second dielectric seal at a distal location, the first and second dielectric seals separated by a gap.

4. A part for terminating a fastener, the part comprising:
   a fastener termination body including a washer having a central opening; and a dry dielectric coating on an exterior surface of the washer, and a first dielectric seal partially covering the central opening at one of a distal and proximal location, the first dielectric seal secured to the fastener termination body, the dry dielectric coating and the first dielectric seal having a thickness and composition for inhibiting lightning current.

\* \* \* \* \*